(12) United States Patent
Kodige et al.

(10) Patent No.: US 9,838,755 B1
(45) Date of Patent: Dec. 5, 2017

(54) SYSTEM AND METHOD FOR DETERMINING TV TUNE-IN ATTRIBUTION

(71) Applicant: Alphonso Inc., San Carlos, CA (US)

(72) Inventors: Raghu Srinivas Kodige, San Carlos, CA (US); Ashish Chordia, Mountain View, CA (US); Lampros Kalampoukas, Brick, NJ (US); Nikhil Sahasrabudhe, Pune (IN)

(73) Assignee: Alphonso Inc., San Carlos, CA (US)

( * ) Notice: Subject to any disclaimer, the term of this patent is extended or adjusted under 35 U.S.C. 154(b) by 0 days.

(21) Appl. No.: 15/478,997

(22) Filed: Apr. 4, 2017

(51) Int. Cl.
| | |
|---|---|
| H04N 7/10 | (2006.01) |
| H04N 7/025 | (2006.01) |
| H04N 21/81 | (2011.01) |
| H04N 21/84 | (2011.01) |
| H04N 21/643 | (2011.01) |
| H04N 21/2668 | (2011.01) |
| H04N 21/24 | (2011.01) |

(52) U.S. Cl.
CPC ....... *H04N 21/812* (2013.01); *H04N 21/2407* (2013.01); *H04N 21/2668* (2013.01); *H04N 21/64322* (2013.01); *H04N 21/84* (2013.01)

(58) Field of Classification Search
CPC .. H04N 21/2668; H04N 21/84; H04N 21/812; H04N 21/64322; H04N 21/2407
See application file for complete search history.

(56) References Cited

U.S. PATENT DOCUMENTS

| | | |
|---|---|---|
| 2011/0289114 A1 | 11/2011 | Yu et al. |
| 2013/0071090 A1 | 3/2013 | Berkowitz et al. |
| 2013/0205318 A1 | 8/2013 | Sinha et al. |
| 2015/0235259 A1* | 8/2015 | Maycotte ........... G06Q 30/0244 705/14.43 |
| 2015/0370814 A1 | 12/2015 | Liodden et al. |
| 2016/0125452 A1* | 5/2016 | Kemp ................ G06Q 30/0267 705/14.44 |
| 2017/0068987 A1* | 3/2017 | Levinson ........... G06Q 30/0275 |

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

Gracenote Entourage™, Gracenote, Inc., Emeryville, California, downloaded from webpage: http://www.gracenote.com/video/media-recognition-and-insights/, download date: Aug. 24, 2016, 5 pages.

\* cited by examiner

*Primary Examiner* — Yassin Alata

(74) *Attorney, Agent, or Firm* — Panitch Schwarze Belisario & Nadel LLP

(57) ABSTRACT

Methods and apparatus are provided for determining a lift metric regarding effectiveness of a digital ad campaign for an audio-visual work on subsequent viewership of the audio-visual work. Viewed content from a universe of monitored AV audio-visual devices is collected. Identifiers of audio-visual devices that received an ad impression for the audio-visual work are also collected. The lift metric may be determined from statistical analysis of this data.

29 Claims, 8 Drawing Sheets

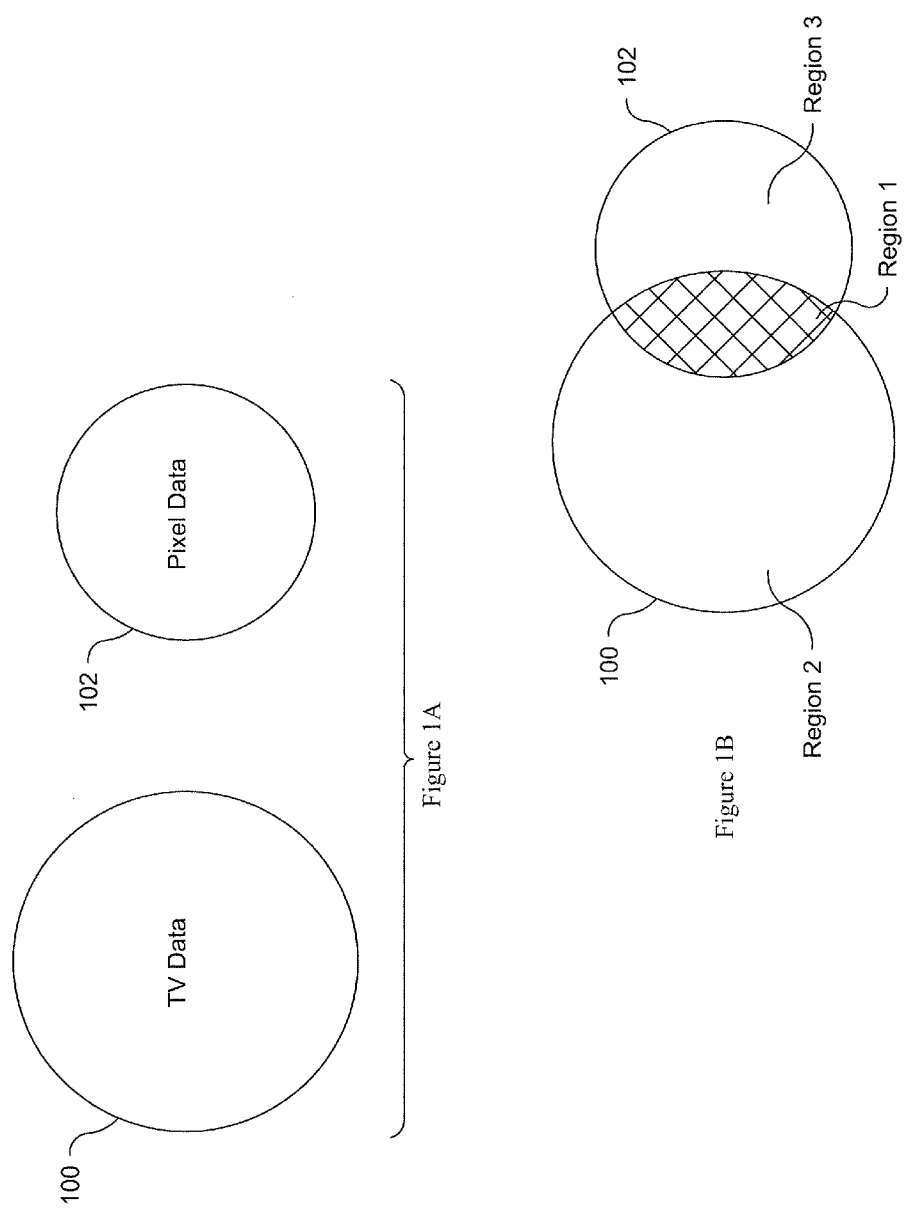

first database 200

Universe of monitored A-V devices

| Identifier(s) associated with monitored AV device | Viewed content of monitored AV device (TV show identifier, time watched) |
|---|---|
| IP address 9100; device ID 1110, device ID 1111 | 8888555, t1; 7777755, t2;.... |
| IP address 9101; device ID 1112 | 1234578, t3; 8866335, t17; .... |
| IP address 9102; device ID 1113 | 3333336, t4; .... |
| IP address 9103; device ID 1114 | 7654321; 1234578, t3; .... |
| ⋮ | ⋮ |
| device ID 2110 | 4444445, t50;... |
| device ID 2112 | 5432444. t51;... |
| ⋮ | ⋮ |
| 210 Main Street, Springfield, PA; device ID 3110 | 4567445, t83;... |
| 5555 Front Street, Pleasantville, NJ; device ID 3226 | 5000144. t84;... |
| ⋮ | ⋮ |

Figure 2

Targeted AV devices second database 300

| Ad impression (show identifier, time of impression) | Identifier of AV device(s) receiving ad impression |
|---|---|
| 3333336, t1 | IP address 9955; device ID 4443<br>IP address 9001<br>IP address 9102; device ID 4449<br>IP address 9103<br>: : |
| 1234578, t2 | IP address 9955; device ID 4443<br>IP address 9001<br>IP address 9101; device ID 4450<br>: : |
| 8866335, t10 | IP address 9222; device ID 4450 (from original source)<br>IP address 9101; device ID 4450 (from database 500) |
| : : | : : |

Figure 3A second database 300

| Ad impression (show identifier, time of impression) | Identifier of AV device(s) receiving ad impression |
|---|---|
| 3333336, t1 | IP address 9955; device ID 4443; physical address 1002<br>IP address 9001; physical address 1330<br>IP address 9102; device ID 4449; physical address 3322<br>IP address 9103; physical address 3325<br>. . |
| 1234578, t2 | IP address 9955; device ID 4443; physical address 1002<br>IP address 9001; physical address 1330<br>IP address 9101; device ID 4450; physical address 4343<br>. . |
| 8866335, t10 | IP address 9222; device ID 4450 (from original source); physical address 3456<br>IP address 9101; device ID 4450 (from database 500); ; physical address 4343<br>. . |
| . . | |

Figure 3B

| Example | Tune_in for Set T | Tune_in for Set C | Lift in tune_in | Comments |
|---|---|---|---|---|
| 1 | 1% | 10% | (1-10)/10 = -0.9 | 1% of IPs that saw the ad actually tuned into the TV show. 10% of IPs that did not see the ad tuned into the TV show. |
| 2 | 5% | 10% | (5-10)/10 = -0.5 | |
| 3 | 10% | 10% | (10-10)/10 = 0.0 | Equal numbers of IPs who did and did not see the ad tuned into the TV show. |
| 4 | 5% | 2% | (5-2)/2 = +1.5 | |
| 5 | 5% | 1% | (5-1)/1 = +4.0 | 5% of IPs that saw the ad actually tuned into the TV show. 1% of IPs that did not see the ad tuned into the TV show. |

Figure 4

IP address/AV device ID database

IP database 500

| IP address | AV device ID |
|---|---|
| 9101 | 4450 |
| 9102 | 4449 |
| 9206; 9209 | 4956 |
| ... | ... |

Figure 5 out-of home (OOH) database 600

| location of out-of-home media advertising device (e.g., billboard) (GPS coordinates) | Ad impression (show identifier, time of impression) |
|---|---|
| ... | ... |

Figure 6

Device graph for physical addresses

| Physical address | IP address | Device ID |
|---|---|---|
| 210 Main Street, Springfield PA | 76.240.249.145 | ESN/IMEI/MEID for iphone 5: 990002286593860 |
| 5555 Front Street, Pleasantville, NJ | 76.123.333.134 | ESN/IMEI/MEID for Samsung Galaxy 5: 660002286554379 |
| ... | ... | ... |

Figure 7

SYSTEM AND METHOD FOR DETERMINING TV TUNE-IN ATTRIBUTION

BACKGROUND OF THE INVENTION

TV networks run promotional campaigns for various TV shows. The campaigns may be in the form of advertisements (ads) on TV or on websites and apps. The TV networks always want to know how effective these campaigns are, in the same manner that companies who sell products and services, want to know how effective their ad campaigns are in driving sales.

Conventional techniques for measuring the effectiveness of such campaigns are inadequate. Accordingly, there is a need for new approaches to measure the effectiveness of such campaigns. The present invention fulfills such a need.

SUMMARY OF THE PRESENT INVENTION

"TV tune-in attribution" is a measurement of how effective a campaign for a TV show was in driving viewership for that show. The campaign may be any type of campaign (e.g., display, video, social media) and may be on any medium (e.g., desktop, mobile, TV). The general process for measuring TV tune-in attribution involves collecting data during the campaign phase in order to identify users who are exposed to the campaign. Once the campaign ends, data is collected on how many of the users exposed to the campaign tuned into the TV show(s) that was promoted in the campaign. Analysis of this data, along with other data on TV watching habits of people who are not exposed to the campaign, is conducted to report on the effectiveness of the campaign. The presumption is made that a user actually viewed the TV show that the TV channel is tuned into.

BRIEF DESCRIPTION OF THE DRAWINGS

Preferred embodiments of the present invention will now be described by way of example with reference to the accompanying drawings:

FIGS. 1A and 1B are pictorial diagrams showing data sets for use in implementing one preferred embodiment of the present invention.

FIGS. 2-7 are database tables for use in implementing one preferred embodiment of the present invention.

DETAILED DESCRIPTION OF THE INVENTION

Figure 8:
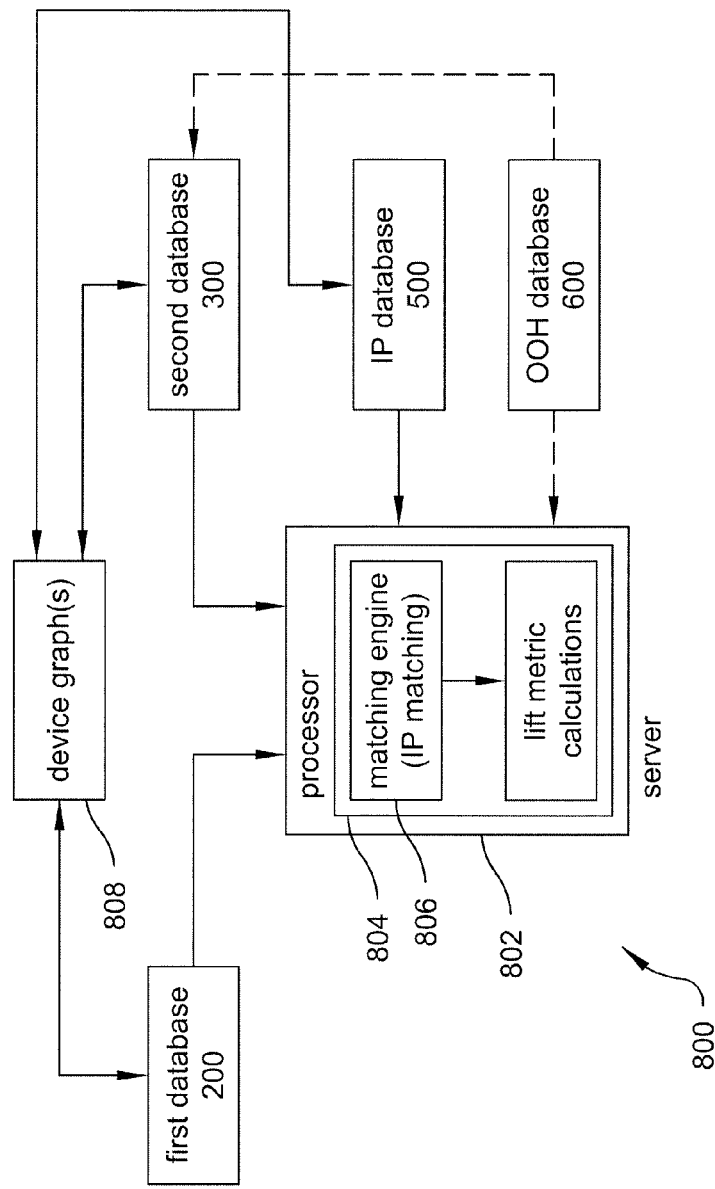
FIG. 8 is a schematic diagram of a system for implementing one preferred embodiment of the present invention.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

lift—marketing industry's term for improvements in sales due an ad campaign, compared to sales levels absent such a campaign. Similarly, "lift" for a TV show represents increases in viewership due to the ad campaign for the TV show, compared to viewership absent such a campaign.

lift metric—a quantifiable value related to the effectiveness of an ad campaign based on a particular equation.

IP address (IP or IP's (plural))—unique identifier of a computer network (e.g., 76.240.249.145). Multiple devices that are on the same network will typically share the same unique IP address. The phraseology that "an IP received an ad impression" or the like means that a particular AV device (e.g., a mobile device) having an associated IP address received the ad impression. Similarly, the phraseology that "an IP tuned into a TV show" means that a particular device (e.g., a smart TV) having an associated IP address tuned into the TV show. That is, the word "IP" is used as a shorthand designation for the devices associated with the IP address. Some AV devices may not have an associated IP address.

device identifier (device ID)—a device ID is equivalent to a "MAC address" or "physical address" which is unique for every device. The device may be a mobile device, smart TV or the like. A device ID is typically fixed, but in the case of mobile devices, their device ID's are now user-resettable. A sample device ID (ESN/IMEI/MEID) for an Iphone® 5 is: 990002286593860.

audio-visual work—a presentation possessing both a sound and a visual component. The audio-visual work in preferred embodiments of the present invention is a TV show. The audio component may be suppressed and substituted with subtitles.

monitored audio-visual (AV) device—a "monitored" AV device refers to a device that is tracked by a monitoring entity which receives and stores data regarding the audio-visual content viewed by a universe of such AV devices. In one preferred embodiment described herein, the monitored AV device is a TV connected to a set-top box that receives TV stations from a cable or satellite TV provider, and may also be a home computer or TV that receives TV shows directly from a service provider such as Hulu®, Amazon® and Netflix® via a home internet connection. The monitored AV device may also be a device such as a Slingbox®. Each monitored AV device may be associated with an IP address, and may also be associated with a device ID. In the example of a cable or satellite TV provider, a set-top box from the TV provider is typically connected to a home network having an IP address. Data from the set-top box indicates what channels are being tuned to and when they are being tuned to the respective channels. This data may be received directly by the entity or indirectly via the TV provider. Alternatively, newer "smart TV's" can also provide this data to the monitoring entity using code embedded therein that is shipped with the TV. Smart TV's also include a device ID that may be reported to the monitoring entity via the home network using the embedded code. A monitored AV device may also be a mobile device that includes an app that performs audio content recognition (ACR) and electronically communicates sampled audio or audio fingerprints to a remote server which identifies audio-visual content viewed by the mobile device. In some instances, the monitored AV device is associated with a physical address (e.g., a home address). For example, a set-top box having a specific device ID may be known by the cable or satellite TV provider to be located at particular home address. In some instances, there may be no known IP address or device ID for such a monitored AV device.

viewed content (played content)—If a particular channel is "tuned to," it is presumed that the content of that channel is being played on an AV device and viewed by a person.

TV show identifier (content identifier)—a TV show identifier identifies a specific TV show (e.g., The Walking Dead, Season 7, Episode 2; The Incredibles (movie)). The identifier is preferably an alphanumeric number which is cross-indexed in a database to the TV show.

tracking tag—an object that is designed to be embedded in a digital ad for tracking ad impressions. The tracking tag includes code that automatically reports back to a remote server various information related to the ad impression, including an IP address (IP) of a device that the digital ad was delivered to and the time of delivery. Optional additional information may include the device ID and placement details of the digital ad on a display screen of the device. The digital ads described herein are related to the TV tune-in campaign. The preferred embodiment of the present invention uses a tracking tag implemented through an embedded image, referred to as "a lightweight 1×1 pixel." As described herein, the time of delivery is presumed to be the same, or nearly the same, as the time that the ad impression is made (e.g., displayed) on the device.

pixel data—identifiers that are returned to the remote server from the devices that received the digital ad with the tracking tag. The identifiers include one or more of IP addresses and device ID's.

TV data—TV viewing history for a universe of monitored AV devices. The TV viewing history includes identifiers of monitored AV devices and viewed content of the monitored AV devices. Some monitored AV devices may not have necessarily watched (tuned into) any particular TV show.

II. Detailed Disclosure

FIGS. 1A, 1B, 2 and 3 show an overview of one preferred embodiment of the present invention for determining a lift metric regarding effectiveness of a digital ad campaign for an audio-visual work on subsequent viewership of the audio-visual work.

FIG. 1A illustrates two sets of data, namely, TV data 100 and pixel data 102.

FIG. 2 shows a high level view of a first database 200 that includes the TV data 100, as well as device ID's of monitored AV devices (when available), and viewed content data. More specifically, the first database 200 includes at least (i) identifier(s) associated with monitored AV devices, and (ii) viewed content of each monitored AV device. The identifiers for each monitored AV device include whatever identifiers are available, such as an IP address, a device ID or a physical address. As shown in the first table entry, multiple devices may be reported on the same network. For example, there may be multiple TV's and computers connected to the same home network, all of which are used to watch TV shows. The viewed content of each monitored AV device is also tracked by show identifier and time of viewing. In this example, devices having IP addresses of 9101 and 9103 both tuned into the same TV show at the same time. Various metadata (not shown) related to the illustrated fields may also be collected and stored in the first database 200.

The first set of identifiers in the first database 200 are identified by an IP address and one or more device ID's. A second set of identifiers in the first database 200 are only identified by a device ID, either because this is the only identifier that is available, or because it is the only identifier that is stored.

A third set of identifiers in the first database 200 are identified by a physical address (e.g., a home address where a monitored AV device is located) and a device ID of the monitored AV device.

The scope of the present invention may include additional sets of known identifiers, such as telephone numbers, personal names, and the like. Future types of devices may be identified by newly developed device identifiers, and the scope of the present invention also includes such identifiers, which may form their own set of additional TV data. As long as the type of identifier can be accurately linked to the viewed content, it may be added to the TV data. As discussed below, device graphs may optionally be used to make the appropriate linking. Stated another way, any unique identifier can be used as long as there is a way to associate captured data from monitored AV devices and captured data from devices that receive digital ads with tracking tags (e.g., device ID's, IP addresses) to the unique identifier.

In the preferred embodiment, the time of viewing time values (t1, t2, . . . ) in FIG. 2 refer to the full time frame in which the AV device was tuned into the respective TV show, including start time and end time. There may be multiple start and end times if the viewer is changing channels back and forth between multiple programs. In alternative embodiments, the time values (t1, t2, . . . ) in FIG. 2 may simply be single points in time collected at regular polling intervals or whenever a channel change is detected.

FIG. 3A shows a high level view of a second database 300 that includes the pixel data 102, as well as other data reported by the tracking tag. For each digital ad, the second database 300 includes at least (i) a TV show identifier (content identifier) of the digital ad and time of impression of the digital ad, and (ii) an identifier of AV device(s) receiving the ad impression, which includes at least an IP address. For illustration purposes, the same identifier is used to represent the TV show identifier and a digital ad for the TV show, even though the length and full content of the TV show differs from the length and full content of the digital ad for the TV show. In an alternative process, these identifiers may differ and a cross-reference table may be used to associate them to one another. Various metadata (not shown) related to the illustrated fields may also be collected and stored in the second database 300.

In one example scenario, the digital ads are targeted to mobile device users, and the digital ads are impressed on display screens of web browsers or on display screens when a user is in an app on the mobile device. The digital ads may also be targeted to home computer devices in a similar manner. The targeted mobile AV device may thus be a mobile phone, a tablet computer, a laptop computer, a desktop computer, or the like.

Scenario 1: Data Analysis Based on Similar IP's

In this scenario, data matching is performed using IP's. This correlates with the first set of identifiers in the first database 200 which are identified by an IP address. As discussed above with respect to the first database 200, the TV data may include other data that lacks an IP address. This TV data is used in scenarios 2 and 3, discussed below.

FIG. 1B diagrammatically illustrates one preferred embodiment of how data mapping based on the two sets of data may be used for the tune-in analysis. This illustration is explained in the context of only one digital ad campaign per diagram. That is, separate diagrams showing sets of data mappings are made for each digital ad campaign to illustrate any overlap. The TV data 100 will be the same in each diagram but the pixel data 102 will vary because each ad campaign targets different AV devices.

Three regions are defined in FIG. 1B, as follows:

Region 1: Exposed data set (IP's exposed to the digital ad and also present in the TV data set). This is the overlapping area of the TV data 100 and the pixel data 102. This data set is also referred to as Test Set, T.

Region 2. Unexposed data set. (IP's present in the TV data that were not exposed to the digital ad.). This is the area of the TV data 100 that does not overlap with the pixel data 102. A Control Set, C, is drawn from this data set.

Region 3: (IP's that were exposed to the digital ad but are not present in the TV data.) This is the area of the pixel data 102 that does not overlap with the TV data 100. This data set is not used in the analysis.

In order to determine a lift metric, it is not sufficient to simply know what IP's are in the two data sets, but it is necessary to determine if a viewer tuned into a particular TV show after being exposed to an ad (via an ad impression) for the TV show and also to determine if a viewer tuned into the particular TV show without being exposed to the ad. The viewed content of the monitored AV devices is used for this purpose, as well as time data regarding the time of an ad impression and the viewing time of the TV shows.

Tune-in Analysis (Lift Metric)

As discussed above, in the preferred embodiment, the time of viewing time values (t1, t2, . . . ) in FIG. 2 refer to the full time frame in which the AV device was tuned into the respective TV show, including start time and end time.

In one preferred embodiment, the tune-in analysis defines being "tuned-in" as any IP (monitored AV device) that has tuned in for at least five minutes into the TV show. This helps to remove data records in the TV data 100 wherein a viewer may have initially started watching a TV show, either intentionally or inadvertently, but then quickly tuned away from it.

One preferred embodiment of a tune-in analysis is as follows:

STEP 1: Select Set T (Test). The entire set of IP's is selected from the overlapping portion. In an alternative embodiment, only a subset of IP's is selected, but the subset must be sufficiently large to provide statistically significant results. The subset may also be selected based on geographic data, demographic data (e.g., income) or the like, particularly if information regarding the efficiency of the campaign for different target groups is desired. The subset may also be selected randomly from either the entire set or a targeted subset.

STEP 2: Select Set C (Control). Select a random set of IP's from the unexposed data set such that the size of set C equals the size of set T. In an alternative embodiment, the size of set C does not need to be equal to the size of set T, but merely has to be large enough to provide statistically significant results. The set C may also be selected based on geographic data, demographic data (e.g., income) or the like, particularly if information regarding the efficiency of the campaign for different target groups is desired. In this case, the set C will be actually be a subset of set C. The set/subset C may also be selected randomly from either the entire set or a targeted subset.

STEP 3: Calculate Tune_in for Set T=% of data points from set T that are 'tuned-in'.

Calculate Tune_in for Set C=% of data-points from set C that are 'tuned-in'.

Lift in tune_in =(Tune_in_T−Tune_in_C)/Tune_in_C, also referred to herein as "(T−C)/C"

FIG. 4 shows sample results of these calculations wherein the "tune-in" lift varies from −0.9 to +4.0, partially summarized in Table 1 below:

TABLE 1

| Example | Lift in tune_in | Comments |
|---------|-----------------|----------|
| 1 | −0.9 | 1% of IPs that saw the ad actually tuned into the TV show. 10% of IPs that did not see the ad tuned into the TV show. |
| 3 | 0.0 | Equal numbers of IPs who did and did not see the ad tuned into the TV show. |
| 5 | +4.0 | 5% of IPs that saw the ad actually tuned into the TV show. 1% of IPs that did not see the ad tuned into the TV show. |

As shown by these values, negative numbers low effectiveness of the ad campaign, wherein the more negative the number, the less effective the ad campaign. Likewise, positive numbers indicate some level of effectiveness of the ad campaign, wherein the more positive the number, the more effective the ad campaign.

Explanation of Sample Data for Tune-in Analysis

Consider the example of an IP that received an ad impression for a particular TV show and then subsequently tuned into that same TV show (this will be an IP in Region 1).

In a first example wherein the TV show identifier is 333336, and referring to FIGS. 2 and 3, an ad impression for TV show 333336 was recorded for an AV device having IP address 9102 at time t1, and then a monitored AV device having the same IP address 9102 tuned into the same TV show 333336 at time t4. These data points would thus appear in the overlapping area (Region 1). In a second example of data mapping wherein the TV show identifier is 1234578, and referring again to FIGS. 2 and 3, an ad impression for TV show 1234578 recorded for an AV device having IP address 9101 at time t2, and then a monitored AV device having the same IP address 9101 tuned into the same TV show 1234578 at time t3. These data points would thus appear in the overlapping area of another diagram.

To further explain the overlapping areas of TV data 100 and pixel data 102, the mere presence of the same identifier of an AV device in both data sets is not sufficient to determine that a viewer tuned into the TV show associated with the ad campaign. For example, referring again to FIGS. 2 and 3, an ad impression for TV show identifier 333336 was recorded for an AV device having an IP address 9103, and the IP address 9103 also appears in the TV data 100. However, there is no record in the TV data 100 that any monitored AV device having this IP address ever tuned into this TV show. Accordingly, this data would not count as a tuned-in IP.

To qualify for tune-in, there must be appropriate temporal matching. That is, the ad impression must have occurred before the tune-in time. Furthermore, in one embodiment, there is a maximum time difference to qualify for overlap because after a very long time has passed, it can no longer be presumed that the viewer tuned into the TV show as a result of the ad impression.

In one preferred embodiment, the AV devices in the universe of monitored AV devices are not the same devices that receive the ad impressions (i.e., the targeted AV devices). As discussed above, one paradigm is that the universe of monitored AV devices are mainly TV's connected to set-top boxes or home computers or TV's that receive TV shows directly from a service provider such as Hulu, Amazon and Netflix via a home internet connection, and that the targeted AV devices are mobile devices. However, the universe of monitored AV devices may include targeted AV devices. For example, digital ad for a TV show may targeted to a smart TV which then gets recorded in the second database 300. The same TV, or another TV sharing the same IP address, subsequently tunes into the TV show which then gets recorded in the first database 200.

FIG. 8 is a schematic diagram of a system 800 for implementing one preferred embodiment of the present invention. A server 802 is in electronic communication with the first database 200, the second database 300 and IP database 500 (described below). The server 802 includes a processor 804 that performs (i) IP matching in a matching engine 806, and (ii) lift metric calculations, as described above. If an out-of-home (OOH) database 600 (described below) is maintained, this database is also in communication with either the server 802 or with the second database 300. One or more device graphs 808 are used to populate the first database 200, the second database 300 and the IP database with selected data.

Scenario 2: Data Analysis Based on Similar Device ID's

A similar process as described above is performed for the second set of TV data which includes a device ID, but no IP address. Referring again to FIG. 1B, the regions are defined as follows:

Region 1: Exposed data set (device ID's exposed to the digital ad and also present in the TV data set). This is the overlapping area of the TV data 100 and the pixel data 102. This data set is also referred to as Test Set, T.

Region 2. Unexposed data set. (device ID's present in the TV data that were not exposed to the digital ad.). This is the area of the TV data 100 that does not overlap with the pixel data 102. A Control Set, C, is drawn from this data set.

Region 3: (device ID's that were exposed to the digital ad but are not present in the TV data.) This is the area of the pixel data 102 that does not overlap with the TV data 100. This data set is not used in the analysis.

Scenario 2 is useful to capture data for the paradigm wherein devices are both receiving ad impressions and also being used to watch content. Mobile devices and certain home computers may be used in this manner, but even home TV's are now used for dual purposes, such as internet surfing where exposure to a digital ad campaign may occur, and regular TV viewing. This is in contrast to Scenario 1 which is useful to capture data for the paradigm wherein one device (e.g., a mobile device) is used to receive an ad impression, but content is watched on a different device (e.g., a home TV) and data is matched up via a common IP address.

A similar tune-in analysis is performed in Scenario 2, wherein the IP's in the tune-in analysis of Scenario 1 are replaced with device ID's. The same alternative embodiments described in STEPS 1 and 2 of Scenario 1 may be used for Scenario 2.

Scenario 3: Data Analysis Based on Similar Physical Addresses

A similar process as described above is also performed for the third set of TV data which includes a physical address and a device ID. Referring again to FIG. 1B, the regions are defined as follows:

Region 1: Exposed data set (physical addresses having a device ID exposed to the digital ad and also present in the TV data set). This is the overlapping area of the TV data 100 and the pixel data 102. This data set is also referred to as Test Set, T.

Region 2. Unexposed data set. (physical addresses having device ID's present in the TV data that were not exposed to the digital ad.). This is the area of the TV data 100 that does not overlap with the pixel data 102. A Control Set, C, is drawn from this data set. However, in an alternative embodiment, the Control Set C may also include the overlapping Region 1, even though it includes a portion of the exposed data set.

Region 3: (physical addresses having device ID's that were exposed to the digital ad but are not present in the TV data.) This is the area of the pixel data 102 that does not overlap with the TV data 100. This data set is not used in the analysis.

To implement Scenario 3, the third set of TV data in the first database 200 and the AV device identifier data in the second database 300 must be populated with physical address data, where available. Third-party sources exist for providing such data. For example, there are third-party data sources that know the physical address of a set-top box (for the monitored AV devices in the first database 200) and the physical address of a mobile device, such as a mobile phone (for the AV devices in the second database 300 or the monitored AV devices of the first database 200). Data analytics companies maintain "device graphs" which can bridge between device ID's, IP addresses, physical addresses, and the like. Device graphs are described in U.S. Patent Application Publication No. 2015/0370814 (Liodden et al.) assigned to TAPAD, Inc. Device graphs are well-known in the art and thus are not further described herein.

The same alternative embodiments described in STEPS 1 and 2 of Scenario 1 may be used for Scenario 3.

FIG. 3B shows a version of FIG. 3A that is populated with physical address data. If no physical address data is available, then the ad impression data is simply not used in the data matching process.

III. Additional Considerations

A. Correlation of IP Addresses with Device ID's

In many instances the tracking tag will report back an IP address that cannot be properly correlated with a monitored AV device. Consider the example of a mobile device that is not on a home wifi network because it is connected to a cellphone network through a data plan (e.g., Verizon LTE). In this instance, the reported IP address will be associated with the cellphone network operator and this IP address differs from any IP address that the mobile device user's home wifi network reports. Consider also another example of a mobile device that is connected to a wifi network outside of the user's home wifi network, such as at a commercial establishment (e.g., STARBUCKS) or a friend's home. Again, the reported IP address will differ from any IP address that the mobile device user's home wifi network reports. However, in both of these instances, the user may receive the ad impression and then go home and watch the TV show, but this data point will not automatically show up in the overlapping set because there are no matching IP addresses.

One way to address this problem is to maintain a database of IP addresses and likely associated device ID's. As discussed above, tracking tags may include the ability to request device ID's, as well as IP addresses. Rather than discard the device ID data, this data may be analyzed to identify IP addresses that are likely to be the device user's home wifi network. More specifically, the matching IP's of AV devices that received the ad impressions and which are in the overlapping Test set (T) may be used to build the database of device ID's and likely associated IP addresses. Then, if a device ID is reported back from a tracking tag, the IP address in this database is automatically associated with the ad impression data, in addition to, or in place of, the reported IP address, which may have come from a cellphone network, commercial establishment, or friend's home. The matching process then uses all of the associated IP addresses in looking for matches with the IP addresses of the monitored AV devices. Alternatively, the matching process only uses IP addresses that are in this "likely association" database. The device graphs referred to above may provide this type of information.

Referring to FIG. 5, IP database 500 shows that two IP's in the overlapping set (9101 and 9102) correlate with respective device ID's 4450 and 4449 so these entries appear in the database 500. Consider now an ad impression for show identifier 8866335 delivered at time t10 to a mobile device having AV device ID 4450 while the mobile device is at a neighbor's house using the neighbor's wifi having IP address 9222. The pixel data 102 will make a record for the IP address of the neighbor's wifi, as shown in FIG. 3A for this ad campaign. However, as a result of a match from the IP database 500 regarding AV device ID 4450, the pixel data 102 will also make a record for the IP address 9101.

Referring now to FIG. 2, a monitored AV device having an IP address 9101 indicates that a TV show having identifier 8866335 was tuned in at time t17. This entry is treated as a match for the ad impression delivered to device ID 4450 at time t10, even though the ad impression was originally detected from a different IP address, namely, the neighbor's IP address 9222.

Over an extended period of time, the IP database 500 will include a very high percentage of active AV devices, particularly, mobile AV devices, and thus regardless of where the ad impressions are received and what IP addresses are reported back from the tracking tags, the system will be capable of accurately correlating ad impressions for TV shows with subsequent viewing of the TV shows, when this occurs. This same process allow for more accurate building of Region 3 data in FIG. 1B because the most relevant IP addresses associated with a device ID will be available for checking against the TV data 100.

B. Out-of-Home Media Advertising

Out-of-home Media Advertising (also, known as "OOH advertising" or "outdoor advertising") is advertising that reaches the consumers while they are outside their homes. One form of OOH advertising delivers ad impressions via billboards or the like. The billboard typically has a fixed location, but may also be mobile in the case of a traveling billboard.

In one alternative embodiment of the present invention, the digital ad is electronically delivered to the billboard, and then a determination is made regarding whether a mobile AV device is sufficiently close (i.e., proximate) to the billboard so as to make a presumption that an ad impression was made on the user of the mobile AV device. In one embodiment, GPS locations of the billboard and mobile AV device are used to make this determination. If so, an entry is made in the second database 300 recording an ad impression for an identifier of the mobile AV device.

For the embodiment of a fixed location billboard, a table of locations (e.g., GPS coordinates) and ad campaigns are maintained in an OOH database 600 shown in FIG. 6. If the billboard is electronic and is delivering a plurality of digital ad campaigns, a time value must be recorded as well. The OOH database 600 may be used in the same manner as described above to identify the appropriate IP address to associate with an AV device that is proximate to the billboard.

If the billboard is a traveling-type billboard, significantly more data points must be collected. However, in most instances, the billboard will be stationary, and thus only one location needs to be maintained in the OOH database 600.

The same attribution process is performed for the OOH advertising as described above with respect to digital ads delivered directly to an AV device. That is, the percentage of viewers who tuned into the TV show after receiving an ad impression is compared to a control group of viewers who did not receive an ad impression, and similar formulas as described above are used to create lift metrics for the OOH advertising. If a digital ad campaign includes digital ads delivered directly to an AV device and OOH advertising, the collected data points may be combined to obtain an overall lift metric, or lift metrics may be separately calculated for each type of ad delivery.

C. Audio-Only Work

While the present invention is described in the context of an audio-visual TV show, the same lift metrics may be applied to an audio-only show, such as a radio show (AM/FM or satellite radio) or an audio streaming service that delivers audio content to a user's device that is connected to a network (e.g., audio-only podcast), assuming that a digital device is used to receive the ad impression and play the audio show. The use of a digital device will usually allow an IP to be identified and captured, and thus the same process described above may be used.

D. Audio ACR for Capturing Viewed Content for Populating the First Database 200

In some instances, the viewed content of a monitored AV device may not be available. For example, the tuned-in channel of the set-top box may not be available. In one alternative embodiment, an app on a user's mobile device automatically captures audio of a nearby TV (presumed to be the viewed content) and electronically communicates the audio data or fingerprints of the audio data to a search engine of a remote server which performs conventional automated content recognition (ACR) to detect the viewed content. Search engines that perform this type of recognition are well-known in the art and are incorporated into automated content recognition (ACR) systems. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent Nos. 2011/0289114 (Yu et al.), 2013/0071090 (Berkowitz et al.), and 2013/0205318 (Sinha et al.), each of which are incorporated by reference herein. Accordingly, the details of an audio ACR process for capturing viewed content is not further described.

Once the tuned-in show is identified, an entry is made in the first database 200. A device graph may be used to identify the appropriate identifier of the monitored AV device by using the IP address and or device ID associated with the user's mobile device that captured the viewed content via the app on the mobile device.

E. Lift Metric Alternatives

In one preferred embodiment, the lift metric is (T−C)/C. However, the scope of the invention includes other lift metrics based on T and C. Different weightings may be also be added to T and C. Additional factors may also be part of the lift metric.

G. Multiple IP Addresses for a Single AV Device ID

Referring again to FIG. 5, multiple IP addresses may be associated with an AV device ID. For example, a third-party entity that builds device graphs may learn that a particular AV device, such as a mobile phone, is frequently used on two different wifi networks. If so, the AV device ID will include both IP addresses. One example of such a data record is shown in FIG. 5. The data in FIG. 5 may be obtained from one or more device graphs, such as the one shown in FIG. 7.

H. Tracking Tag Alternatives

In the preferred embodiment, tracking tags return IP addresses and device ID's (if available), and this data becomes the pixel data. However, in an alternative embodiment, the tracking tag may return other types of identifiers of AV devices that received the ad impression. As long as those identifiers can be matched up with identifiers associated with monitored AV devices, similar lift metric analysis can be performed in the same manner as described above. Device graphs may be useful for this purpose.

The present invention may be implemented with any combination of hardware and software. If implemented as a computer-implemented apparatus, the present invention is implemented using means for performing all of the steps and functions described above.

When implemented in software, the software code for the processor 804 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the server 802 and its processor 804 may be embodied in any of a number of forms, such as a rack-mounted computer or a desktop computer.

The databases 200, 300, 500 and 600 may be interconnected with the server 802 by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for determining a lift metric regarding effectiveness of a digital ad campaign for an audio-visual work on subsequent viewership of the audio-visual work, the method comprising:
(a) electronically collecting and storing, in a first database that is in communication with a server, data records of monitored audio-visual devices that include:
(i) unique identifiers associated with a universe of monitored audio-visual devices,
(ii) audio-visual content played by the universe of monitored audio-visual devices, including content identifiers of the played audio-visual content, and
(iii) time of the played audio-visual content;
(b) receiving, at the server, and electronically storing, in a second database that is in communication with the server, data records of digital ad campaign data that includes:
(i) a content identifier of the digital ad,
(ii) unique identifiers of devices that electronically received the digital ads, and
(iii) time of electronic delivery of the digital ad to the respective devices;
(c) identifying, by the server in a matching engine of the server that is in communication with the first and second database:

(i) a first set of unique identifiers of monitored audio-visual devices that match the unique identifiers of the devices that electronically received the digital ads, and (ii) a second set of unique identifiers of monitored audio-visual devices that do not match the unique identifiers of any of the devices that electronically received the digital ads; and (d) calculating, by the server, using the content identifier of the played audio-visual content and the time of the played audio-visual content, and the content identifier of the digital ad and the time of electronic delivery of the digital ad:

(i) a percentage, T, of a subset of the first set of unique identifiers associated with monitored audio-visual devices that played the audio-visual content associated with the digital ad after the digital ad was delivered, (ii) a percentage, C, of a subset of the second set of unique identifiers associated with the monitored audio-visual devices that played the audio-visual content associated with the digital ad, and (iii) a lift metric, based on at least T and C, regarding effectiveness of the digital ad campaign for an audio-visual work on subsequent viewership of the audio-visual work, wherein the higher the lift metric, the more effective the digital ad campaign.

2. The method of claim 1 wherein the unique identifiers of the monitored audio-visual devices and the devices that electronically received the digital ads are IP addresses associated with the devices.

3. The method of claim 2 wherein the IP addresses for at least some of the devices that electronically received the digital ads are obtained by associating device identifiers of the devices with previously designated IP addresses for the respective devices.

4. The method of claim 1 wherein the lift metric is $(T-C)/C$.

5. The method of claim 1 wherein the unique identifiers of the monitored audio-visual devices and the devices that electronically received the digital ads are device identifiers associated with the devices.

6. The method of claim 1 wherein the subset of the first set of unique identifiers associated with monitored audio-visual devices includes the entire first set of unique identifiers.

7. The method of claim 1 wherein the subset of the first set of unique identifiers associated with monitored audio-visual devices is a randomly selected from the first set of unique identifiers.

8. The method of claim 1 wherein the subset of the second set of unique identifiers associated with monitored audio-visual devices is randomly selected from the second set of unique identifiers.

9. The method of claim 1 wherein the subset of the second set of unique identifiers associated with monitored audio-visual devices is randomly selected from the second set of unique identifiers and is equal in sample size to the entire first set of unique identifiers.

10. The method of claim 1 wherein further comprising:

(f) embedding a tracking tag in the digital ad for the audio-visual work to be delivered to a plurality of devices that electronically received the digital ads, the tracking tag configured to automatically report to the server the data in the second database.

11. The method of claim 1 wherein the devices that electronically receive the digital ads are mobile audio-visual devices.

12. The method of claim 1 wherein the audio-visual work is a TV show.

13. A system for determining a lift metric regarding effectiveness of a digital ad campaign for an audio-visual work on subsequent viewership of the audio-visual work, the system comprising:

(a) a first database that receives and maintains data records of monitored audio-visual devices that include:

(i) unique identifiers associated with a universe of monitored audio-visual devices, (ii) audio-visual content played by the universe of monitored audio-visual devices, including content identifiers of the played audio-visual content, and (iii) time of the played audio-visual content;

(b) a second database that receives and maintains data records of digital ad campaign data that includes:

(i) a content identifier of the digital ad, (ii) unique identifiers of devices that electronically received the digital ads, and (iii) time of electronic delivery of the digital ad to the respective devices; and (c) a server in electronic communication with the first and second databases identifying, the server including a matching engine configured to identify:

(i) a first set of unique identifiers of monitored audio-visual devices that match the unique identifiers of the devices that electronically received the digital ads, and (ii) a second set of unique identifiers of monitored audio-visual devices that do not match the unique identifiers of any of the devices that electronically received the digital ads, wherein the server is further configured to calculate, using the content identifier of the played audio-visual content and the time of the played audio-visual content, and the content identifier of the digital ad and the time of electronic delivery of the digital ad:

(i) a percentage, T, of a subset of the first set of unique identifiers associated with monitored audio-visual devices that played the audio-visual content associated with the digital ad after the digital ad was delivered, (ii) a percentage, C, of a subset of the second set of unique identifiers associated with the monitored audio-visual devices that played the audio-visual content associated with the digital ad, and (iii) a lift metric, based on at least T and C, regarding effectiveness of the digital ad campaign for an audio-visual work on subsequent viewership of the audio-visual work, wherein the higher the lift metric, the more effective the digital ad campaign.

14. The system of claim 13 wherein the unique identifiers of the monitored audio-visual devices and the devices that electronically received the digital ads are IP addresses associated with the devices.

15. The system of claim 14 wherein the IP addresses for at least some of the devices that electronically received the digital ads are obtained by associating device identifiers of the devices with previously designated IP addresses for the respective devices.

16. The system of claim 13 wherein the lift metric is $(T-C)/C$.

17. The system of claim 13 wherein the unique identifiers of the monitored audio-visual devices and the devices that electronically received the digital ads are device identifiers associated with the devices.

18. The system of claim 13 wherein the subset of the first set of unique identifiers associated with monitored audio-visual devices includes the entire first set of unique identifiers.

19. The method of claim 13 wherein the subset of the first set of unique identifiers associated with monitored audio-visual devices is a randomly selected from the first set of unique identifiers.

20. The system of claim 13 wherein the subset of the second set of unique identifiers associated with monitored audio-visual devices is randomly selected from the second set of unique identifiers.

21. The system of claim 13 wherein the subset of the second set of unique identifiers associated with monitored audio-visual devices is randomly selected from the second set of unique identifiers and is equal in sample size to the entire first set of unique identifiers.

22. The system of claim 13 further comprising:
(d) a tracking tag embedded in the digital ad for the audio-visual work to be delivered to a plurality of devices that electronically received the digital ads, the tracking tag configured to automatically report to the server the data in the second database.

23. The system of claim 13 wherein the devices that electronically receive the digital ads are mobile audio-visual devices.

24. The system of claim 13 wherein the audio-visual work is a TV show.

25. An automated method for determining a lift metric regarding effectiveness of a digital ad campaign for an audio-visual work on subsequent viewership of the audio-visual work, the method comprising:
(a) electronically collecting and storing, in a first database that is in communication with a server, data records of monitored audio-visual devices that include:
(i) unique identifiers associated with a universe of monitored audio-visual devices,
(ii) audio-visual content played by the universe of monitored audio-visual devices, including content identifiers of the played audio-visual content, and
(iii) time of the played audio-visual content;
(b) receiving, at the server, and electronically storing, in a second database that is in communication with the server, data records of digital ad campaign data that includes:
(i) a content identifier of the digital ad,
(ii) unique identifiers of devices that are proximate to a device that electronically received the digital ads, and
(iii) time of electronic delivery of the digital ad to the respective devices;
(c) identifying, by the server in a matching engine of the server that is in communication with the first and second database:
(i) a first set of unique identifiers of monitored audio-visual devices that match the unique identifiers of the devices that electronically received the digital ads,
(ii) a second set of unique identifiers of monitored audio-visual devices that do not match the unique identifiers of any of the devices that electronically received the digital ads; and
(d) calculating, by the server, using the content identifier of the played audio-visual content and the time of the played audio-visual content, and the content identifier of the digital ad and the time of electronic delivery of the digital ad:
(i) a percentage, T, of a subset of the first set of unique identifiers associated with monitored audio-visual devices that played the audio-visual content associated with the digital ad after the digital ad was delivered,
(ii) a percentage, C, of a subset of the second set of unique identifiers associated with the monitored audio-visual devices that played the audio-visual content associated with the digital ad, and
(iii) a lift metric, based on at least T and C, regarding effectiveness of the digital ad campaign for an audio-visual work on subsequent viewership of the audio-visual work, wherein the higher the lift metric, the more effective the digital ad campaign.

26. The method of claim 25 wherein the devices that are proximate to the device that electronically received the digital ads are mobile audio-visual devices, and the device that electronically received the digital ad is an out of home advertising device having an associated location, the method further comprising:
(e) electronically comparing the location of the out of home advertising device with a location of the mobile audio-visual devices to determine if any of the mobile audio-visual devices were proximate to the out of home advertising device, wherein the digital ad is presumed to be electronically delivered to the mobile audio-visual device when the two locations are proximate to one another.

27. The method of claim 26 wherein the location of the out of home advertising device is fixed.

28. The method of claim 25 wherein the lift metric is $(T-C)/C$.

29. The method of claim 25 wherein the audio-visual work is a TV show.

* * * * *